United States Patent
Chen et al.

(10) Patent No.: US 8,384,032 B2
(45) Date of Patent: Feb. 26, 2013

(54) METHOD FOR SAVING POWER CONSUMPTION OF POSITION SENSITIVE DETECTOR

(75) Inventors: Weigen Chen, Shanghai (CN); Guofeng Chen, Shanghai (CN); Xingyan Liu, Shanghai (CN); Xiongtao Zheng, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 525 days.

(21) Appl. No.: 12/582,840

(22) Filed: Oct. 21, 2009

(65) Prior Publication Data

US 2010/0201276 A1 Aug. 12, 2010

(30) Foreign Application Priority Data

Oct. 22, 2008 (CN) .......................... 2008 1 0201504

(51) Int. Cl.
*G01J 5/00* (2006.01)
*E03C 1/05* (2006.01)

(52) U.S. Cl. ......................................... 250/341.8; 4/623
(58) Field of Classification Search .... 4/623; 250/341.8
See application file for complete search history.

(56) References Cited

U.S. PATENT DOCUMENTS

| | | | | |
|---|---|---|---|---|
| 4,909,624 | A | * | 3/1990 | Tsuru et al. .................. 356/3.08 |
| 5,148,211 | A | * | 9/1992 | Kotani et al. ................. 396/123 |
| 6,707,030 | B1 | * | 3/2004 | Watson ....................... 250/252.1 |

* cited by examiner

*Primary Examiner* — Constantine Hannaher
(74) *Attorney, Agent, or Firm* — Foley & Lardner LLP

(57) ABSTRACT

A method for saving power consumption of a position sensitive detector used in a smart bathroom product includes changing infrared light emitting strength modes depending on the received strength of reflected infrared light. If the emitting mode is already the strongest, and the strength of the reflected infrared light received back from a reflecting object is weak, the method includes conducting multiple subsequent emissions and averaging the returns to estimate a distance to the infrared light reflecting object.

4 Claims, 1 Drawing Sheet

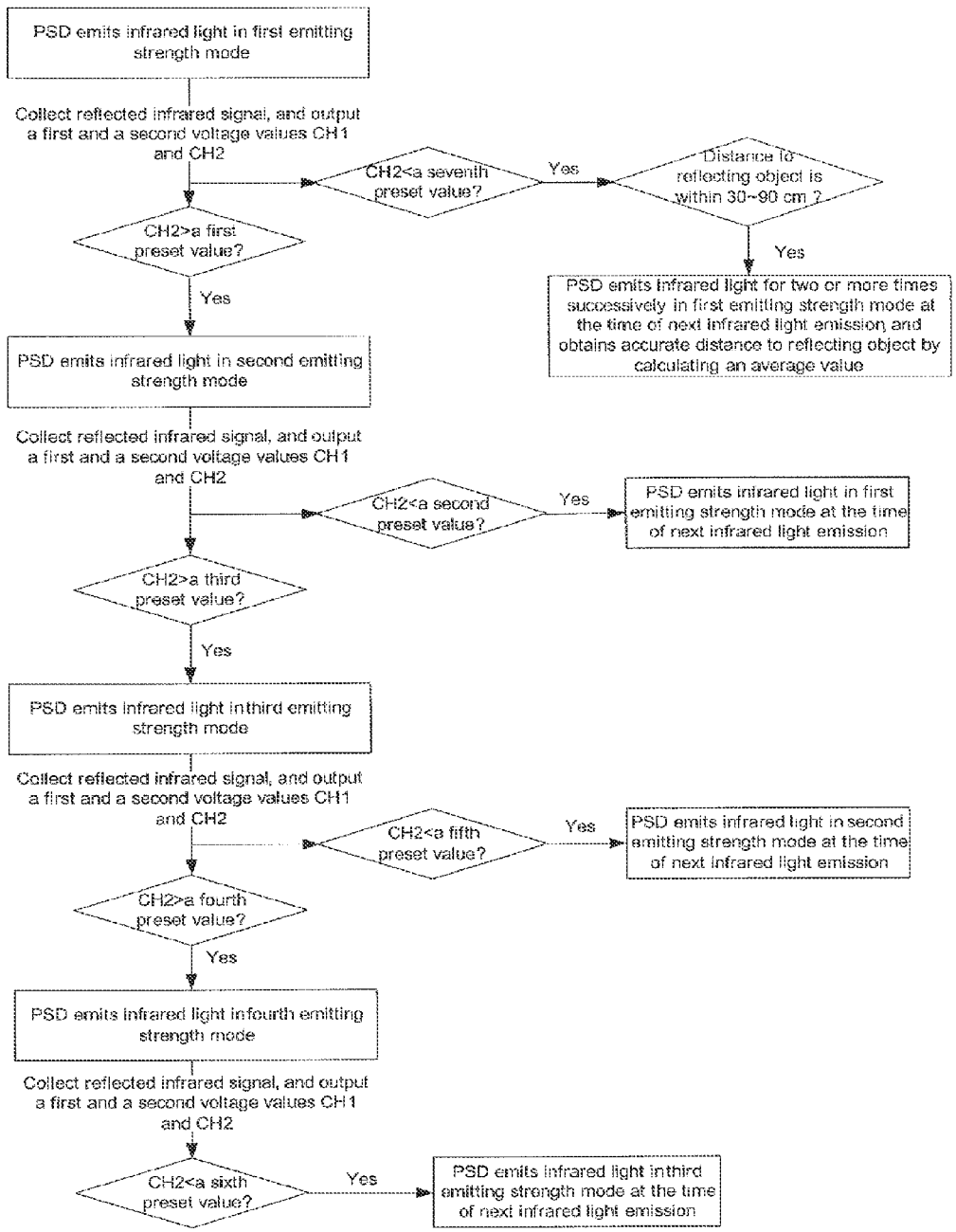

METHOD FOR SAVING POWER CONSUMPTION OF POSITION SENSITIVE DETECTOR

FIELD OF THE INVENTION

The present invention relates to a method for saving power consumption of a position sensitive detector, and in particular to a method for saving power consumption of a position sensitive detector used in the smart bathroom product field.

BACKGROUND OF THE INVENTION

In the smart bathroom product field, infrared sensors have been applied widely in products such as auto faucets, automatic flushing urinals, flushing devices for toilet bowls, toilet seats spraying warm water, hand driers and toilet bowls equipped with warm-air fans.

Most of the infrared sensors used in traditional smart bathroom products operate in an active infrared sensing mode. That is, an infrared emitter emits a certain wavelength of infrared light, and after the infrared light is reflected from a human body and received by an infrared receiver, the strength of the reflected signal is determined to achieve automatic sensing determination. However, it is difficult to achieve automatic sensing determination with respect to some substances having a low reflectivity to infrared light, such as black clothes and hair. After the infrared emitter emits infrared light, only a very small part of the infrared light reflected by such a substance is received by the infrared receiver. Due to the insufficient strength of the reflected signal, the sensor is unable to determine whether there exists a subject, thus causing a failure of sensing.

In order to solve the problem of the failure of sensing in the traditional infrared sensing bathroom products, a position sensitive detector (PSD) is induced into the bathing automation field. The PSD controls whether the bathroom product where the PSD is located is to perform an operation such as water releasing and flushing by detecting whether the distance to a subject to be detected is within a preset range. Since the PSD achieves the automatic sensing function by determining the distance from itself to the subject instead of by determining the strength of the reflected signal, the defect existing in traditional infrared sensing that "the insufficient strength of the reflected signal causes a failure of sensing" can be overcome effectively.

At present, the PSDs used in the smart bathroom products are generally powered by a battery. By the factor of the operation principle of a PSD, its power consumption is generally larger than that of an ordinary infrared sensor mainly because of the following two aspects:

1. In order to increase the strength of the signal of the PSD for sensing an object having a low reflectivity, an emitting current larger than that of the ordinary infrared sensor is usually used for signal collection, which results in the increase of the emitting power consumption.

2. In order to increase the precision for detecting the distance to the object having a weak reflectivity by the PSD product, an approach of obtaining an average value of signals collected for multiple times in unit time is generally used.

Therefore, due to the service life of the battery, it is necessary to decrease the power consumption of a PSD product used in a smart bathroom product as much as possible to prolong the service life of the battery so as to reduce the inconvenience caused by the depletion of the battery and the frequent replacement of the battery, allowing the PSD product to be applied widely.

Hence, a method for decreasing power consumption of the PSD product is also needed urgently in the art.

SUMMARY OF THE INVENTION

A technical problem to be solved by the present invention is to provide a method for decreasing power consumption of a position sensitive detector used in a smart bathroom product, allowing the wording life of the position sensitive detector to be longer under the existing battery powering condition.

The technical problem to be solved by the present invention can be solved by using the following technical solutions.

There is provided a method for saving power consumption of a position sensitive detector, wherein the position sensitive detector includes an infrared light emitting device and an infrared light receiving device. The infrared light emitting device is configured with infrared light emitting modes of at least two strengths, i.e. a first infrared light emitting strength mode and a second infrared light emitting strength mode. The method includes the steps of:

emitting, by the infrared light emitting device, infrared light in the first infrared light emitting strength mode which is relatively stronger;

receiving, by the infrared light receiving device, the infrared light as reflected back;

setting a first preset value, calculating a signal strength of the infrared light received and measured by the infrared light receiving device, and comparing the calculated signal strength with the first preset value; and when the strength of the received signal is larger than the first preset value, switching the infrared light emitting device to the second infrared light emitting strength mode which is relatively weaker to emit infrared light at the time of next infrared light emission.

Further, a second preset value is set. When the strength of the received infrared signal is smaller than the second preset value, the infrared light emitting device is switched to the first infrared light emitting strength mode to emit infrared light at the time of next infrared light emission.

Further, two voltage values to be output are calculated based on the received infrared signal as reflected back to reflect the strength of the signal. When switching the emitting strength modes, the first and second preset values are compared with one of the two voltage values for determination.

Further, a seventh preset value is set. When the voltage value output based on the received infrared signal as reflected back is smaller than the seventh preset value at the time of infrared light emission in the first infrared light emitting strength mode, a distance to a reflecting object is calculated based on the two output voltage values.

Further, the seventh preset value is identical to the second preset value.

Further, a preset distance value is set. An actual distance value to the reflecting object is calculated according to the two voltage values output based on the strength of the received infrared light. The actual distance value is compared with the preset distance value. If the actual distance value complies with a range for the preset distance value, the infrared light emitting device emits infrared light successively for two or more times at the time of next infrared light emission, and determines the distance to the object reflecting the infrared light by obtaining an average value of the strengths of the received reflected signals.

Further, the range for the preset distance value is 30~90 cm.

The technical problem to be solved by the present invention can also be solved by using the following technical solutions.

There is provided s method for saving power consumption of a position sensitive detector, wherein the position sensitive detector includes an infrared light emitting device and an infrared light receiving device. The infrared light emitting device is configured with infrared light emitting modes of four strengths which are a first, a second, a third and a fourth infrared light emitting strength modes respectively in an order from strong to weak. The method includes the steps of:

emitting, by the infrared light emitting device, infrared light in the first infrared light emitting strength mode which is relatively stronger;

receiving, by the infrared light receiving device, the infrared light as reflected back;

setting a first, a second, a third and a fourth preset values; when the strength of the infrared light received by the infrared light receiving device is larger than the first preset value at the time of infrared light emission in the first infrared light emitting strength mode, the infrared light emitting device is switched to the second infrared light emitting strength mode; when the strength of the infrared light received by the infrared light receiving device is larger than the third preset value at the time of infrared light emission in the second infrared light emitting strength mode, the infrared light emitting device is switched to the third infrared light emitting strength mode; and when the strength of the infrared light received by the infrared light receiving device is larger than the fourth preset value at the time of infrared light emission in the third infrared light emitting strength mode, the infrared light emitting device is switched to the fourth infrared light emitting strength mode; and when the strengths of the infrared light received by the infrared light receiving device are smaller than the second, a fifth and a sixth preset values at the time of infrared light emission in the second, the third and the fourth infrared light emitting strength modes, respectively, the infrared light emitting device is switched to the immediately next stronger infrared light emitting strength mode.

Further, a seventh preset value is set. When the voltage value output based on the received infrared signal as reflected back is smaller than the seventh preset value at the time of infrared light emission in the first infrared light emitting strength mode, a distance to a reflecting object is calculated based on the two output voltages.

Further, a preset distance value is set. An actual distance value to the reflecting object calculated according to the two voltage values output based on the strength of the received infrared light as reflected back is compared with the preset distance value. If the actual distance value complies with a range for the preset distance value, the infrared light emitting device emits infrared light successively for two or more times at the time of next infrared light emission, and determines the distance to the object reflecting infrared light by obtaining an average value of the strengths of the received reflected signals.

Further, the second, the fifth, the sixth and the seventh preset values are identical.

Compared to the prior art, the present invention sets infrared light emitting strength modes with different strengths by classifying different situations, so as to control the emitting power of the PSD, and allow the power consumption of the PSD to meet application requirements without waste. The present invention solves the contradiction between the over large consumption power of the traditional PSD and the distance detecting precision. That is, the low power consumption characteristic of an ordinary sensor is combined with the high detecting precision of the PSD so as to avoid the problem of over large power consumption while enhancing the performance of the sensor.

BRIEF DESCRIPTIONS OF THE DRAWINGS

FIG. 1 is a flowchart according to an embodiment of the present invention.

DETAILED DESCRIPTIONS OF THE EMBODIMENTS

The PSD is a photoelectric device sensitive to the position of incident light, and includes an infrared light emitting device and an infrared light receiving device. The infrared light emitted by the infrared light emitting device is reflected back when meeting an obstacle and received by the infrared light receiving device. The receiving process is that the emitted light as reflected back (also called incident light) is irradiated onto a light-sensitive surface of the receiving device. When the incident light is irradiated onto different positions of the light-sensitive surface, different electric signals are output, which are usually of two voltage values (CH1, CH2). Then, the distance to the reflecting object is calculated based on the two voltage values by using the triangulation principle. The PSD achieves automatic sensing determination involved in the smart bathroom product, such as automatic flushing of an intelligent closestool, automatic water releasing of an automatic faucet and drying function of a hand drier, due to its property of precise distance calculation.

In an embodiment, the PSD for a smart bathroom product according to the present invention has four infrared light emitting modes from strong to weak. In a preferred embodiment of the present invention, in a first, a second, a third and a fourth strength modes, the powering currents of the battery are 0.8 A, 0.8 A, 0.2 A and 0.2 A, respectively, while the duration of each infrared light emission is 19 μs, 11 μs, 22 μs and 5 μs. The present invention achieves the object of power consumption saving by switching between the different emitting strength modes. It is apparent that the above specific values can depend on the practical application situations.

In addition, the infrared light receiving device of the PSD involved in the present invention has three signal acquisition frequencies, which are one acquisition every 1, 2 and 6 seconds, respectively. The power consumption of the PSD can be further decreased by switching between the different signal acquisition frequencies, as described later.

A method for saving power consumption of a PSD used in a smart bathroom product involved in the present invention will be described further below in conjunction with a specific embodiment. In other different embodiments, the specific emitting strength mode parameter and such parameters as the current value, the infrared light emitting duration, the infrared signal acquisition frequency in respective mode for the PSD, to which the method for saving power consumption of a PSD used in a smart bathroom product involved in the present invention is applicable, are not limited to those given to the above PSD as examples, and can vary based on respective specific situations. For example, there can be 2 emitting strength modes, 3 emitting strength modes, 5 emitting strength modes, 6 emitting strength modes, 7 emitting strength modes and so on. There can be only one infrared signal acquisition frequency or a plurality of infrared signal acquisition frequencies. The acquisition frequency can be one acquisition every 1 second, one acquisition every 2 seconds, one acquisition every 3 seconds, one acquisition every 4 seconds, one acquisition every 5 seconds, one acquisition every 6 seconds, one acquisition every 7 seconds, one acquisition every 8 seconds, one acquisition every 10 seconds, one acquisition every 12 seconds, one acquisition every 15 seconds and so on. Accordingly, the interval for emitting infrared light can correspond to a respective infrared signal acquisition mode, but is not limited thereto.

In an embodiment of the method for saving power consumption involved in the present invention by using the above-mentioned PSD, the infrared light emitting device of the PSD installed on a smart bathroom product emits infrared light in a first strength mode, and the infrared light receiving device receives the reflected infrared light. When the second voltage value CH2 of the two voltage values output by the infrared light receiving device based on the strength of the received infrared signal exceeds a first preset value, the emitting strength mode is switched to a second strength mode at the time of next infrared light emission. It is noted that the first voltage value CH1 is different from the second voltage value CH2, and which voltage value is to be adopted for determination depends on the practical requirements. In the embodiment of the present invention described below, the description such as adopting the second voltage value CH2 is only for the convenience of description. It is apparent that the first voltage value CH1 can also be adopted for the description purpose. The respective preset value is also set based on the respective voltage value. In the present invention, it is relatively desirable that the first preset value is in a range of 1000~2500 mV. In a preferred embodiment, the first preset value is 1100 mV.

When the infrared light emitting device emits infrared light in the second emitting strength mode, if the value CH2 of the voltage values output by the infrared light receiving device based on the strength of the received infrared signal reflected back is smaller than the second preset value, the emitting strength mode is switched to the first strength mode at the time of next infrared light emission. In the present invention, it is relatively desirable that the second preset value is in a range of 300~700 mV. In a preferred embodiment, the second preset value is 500 mV. If the value CH2 of the output voltage values is larger than a third preset value, the emitting strength mode is switched to a third strength mode at the time of next infrared light emission. In a preferred embodiment of the present invention, the third preset value is 1970 mV.

A fifth preset value is set. When the infrared light emitting device emits infrared light in the third emitting strength mode, if the value CH2 of the voltage values output by the infrared light receiving device based on the strength of the received infrared signal reflected back is smaller than the fifth preset value, the emitting strength mode is switched to the second strength mode at the time of next infrared light emission. A fourth preset value is set. If the value CH2 of the output voltage values is larger than the fourth preset value, the emitting strength mode is switched to a fourth strength mode at the time of next infrared light emission. In a preferred embodiment of the present invention, the fourth preset value is equivalent to the third preset value.

A sixth preset value is set. When the infrared light emitting device emits infrared light in the fourth emitting strength mode, if the value CH2 of the voltage values output by the infrared light receiving device based on the strength of the received infrared signal reflected back is smaller than the sixth preset value, the emitting strength mode is switched to the third strength mode at the time of next infrared light emission.

As mentioned above, for a strong reflecting object with respect to which the acquired signal value is larger than a preset value such as the third preset value for example, the feedback obtained when emitting a first signal is a strong reflecting signal, and accordingly, the emitting current is lowered, that is, a weak emission is adopted to save the power consumption. For a weak reflecting object with respect to which the acquired signal value is smaller than a preset value such as the first preset value for example, the feedback obtained when emitting the first signal is a weak reflecting signal, and a high emitting current is used to emit a signal and the emitting frequency is increased to be corresponding to a strong emitting mode. Since the power consumptions involved in different emitting strength modes are different, the object of saving power consumption can be achieved by switching between different emitting strength modes.

In other embodiments, the above preset standard values 500 mV, 1100 mV and 1970 mV can be set based on specific situations. Specifically, in various embodiments, the preset standard value can be 200 mV, 300 mV, 400 mV, 600 mV, 700 mV, 800 mV, 900 mV, 1000 mV, 1200 mV, 1300 mV, 1400 mV, 1500 mV, 1600 mV, 1700 mV, 1800 mV, 2000 mV, 2100 mV, 2200 mV, 2300 mV, 2400 mV, 2500 mV and etc.

Moreover, in order to further save the power consumption of the PSD, in the case that nobody is using the PSD, the signal acquisition frequency of the infrared light receiving device of the PSD can be different from that in the case that someone is using the PSD. For example, in the case that someone is using the PSD, it is one acquisition every 1 second. In the case that nobody is using the PSD, it can be one acquisition every 2 seconds. After the case that nobody is using the PSD continues for a certain time period, for example, for one hour, the signal acquisition frequency changes into one acquisition every 6 seconds to enter a sleep state. In other embodiments, the time involved in various signal acquisition modes can be modified based on specific situations, and is not limited to the above examples.

In an embodiment, the determination that nobody is using the PSD can follow the operations described as below. The PSD is set with a preset distance value before being used actually. In practical applications, an actual distance value is calculated based on the two voltage values CH1 and CH2 output according to the signal strength of the reflected infrared light as received by the infrared light receiving device of the PSD. Sensing information on whether there exists someone is obtained by comparing the actual distance value with the preset distance value. In the case that nobody is using the PSD, the PSD acquires signals one time every 2 seconds, and enters a state in which the acquisition is executed one time every 1 second when it is determined that sensing information indicating that there exists someone is acquired. After the state that nobody is using the PSD continues for a certain time period such as 0.5 hour, 1 hour or 2 hours, the infrared light acquiring interval is prolonged to around 6 seconds. Moreover, it is achieved based on the determination of the received signal strength which level of emitting strength mode is to be used specifically in each emission. Further, whether the infrared light emitting interval corresponds to the signal acquiring interval can be set based on specific situations and is not limited to the above examples.

Further, when the PSD finds that the obtained distance value complies with the sensing condition that there exists someone, the acquisition frequency is changed into one acquisition every 1 second. If the distance values obtained for n times successively (in various embodiments, the specific value of n can depend on the specific requirements) comply with the sensing condition that there exists someone, the PSD enters a sensing state. Further, when the PSD finds that the distance values obtained for n times successively do not comply with the sensing condition that there exists someone after entering the sensing state, it exits from the using state. For various smart bathroom products, such as auto faucets and automatic flushing urinals, the operation under the state that someone is sensed can be water releasing before use, water flushing before use, water releasing after use or water flushing after use.

Further, in order to increase the detecting precision for an object having a weak reflectivity, another embodiment of the present invention provides a method for calculating an average value of the signals acquired for many times.

In an embodiment, in the strongest infrared light emitting mode, the distance to the reflecting object is calculated based on the two output voltage values only when the signal strength of the collected infrared light reflected back is relatively weak and is smaller than a seventh preset value. It is preferable that the seventh preset value is within a range of 200~700 mV. In a preferred embodiment of the present invention, the seventh preset value is 500 mV.

Further, when the distance to the reflecting object calculated based on the two output voltage values is within a preset range of 30~90 cm, for example, the PSD detects the distance to the reflecting object at the time of next emission by emitting infrared light for multiple times and calculating the average value. Such a configuration can enhance the determination precision significantly.

In a preferred embodiment of the present invention, the fifth, sixth and seventh preset values are identical to the second preset value.

The initiation of the multi-time acquisition approach is restrained by the signal strength and the distance value, thereby avoiding the use of the multi-time acquisition approach when the distance to the reflecting object is too close or too far. In this way, the acquisition precision can be ensured while the power consumption can be saved reasonably.

To summarize, the processing flow, in which the embodiment of switching the strength modes and the embodiment of emitting successively for multiple times and calculating the average value involved in the present invention are combined, is as shown in FIG. 1.

It has been mentioned that the method for saving power consumption of the present invention does not necessarily adopt four emitting strength modes. In another preferred embodiment, only a strong emitting mode and a weak emitting mode, i.e. a first infrared light emitting strength mode and a second infrared light emitting strength mode, are adopted. By referring to the above embodiment in which four emitting modes are adopted, a first preset value, a second preset value, a seventh preset value and a distance preset value are set. When the obtained voltage value CH2 is larger than the first preset value in the first infrared light emitting strength mode, the infrared light is to be emitted in the second infrared light emitting strength mode. When the obtained voltage value CH2 is smaller than the second preset value in the second infrared light emitting strength mode, the infrared light is to be emitted in the first infrared light emitting strength mode. When the voltage value CH2 is smaller than the seventh preset value in the first infrared light emitting strength mode, the approach in which there are two or more times of successive emissions is adopted based on the distance determination. The specific embodiments can be made by making reference to the embodiments of the above-mentioned four strength emitting modes, and the description thereof is omitted here.

Similarly, three or another number of infrared light emitting strength modes can also be set.

While the specific embodiments of the present invention have been described above, they do not be deemed as a limit to the scope of the present invention. The modifications and variations made by those skilled in the art to these specific embodiments

What is claimed is:

1. A method for saving power consumption of a position sensitive detector, wherein the position sensitive detector comprises an infrared light emitting device and an infrared light receiving device, and the infrared light emitting device is configured with infrared light emitting modes of at least two strengths which are a first infrared light emitting strength mode and a second infrared light emitting strength mode, the method comprising the steps of:

emitting, by the infrared light emitting device, infrared light in the first infrared light emitting strength mode which is relatively stronger;

receiving, by the infrared light receiving device, the infrared light as reflected back;

setting a first preset value, calculating a signal strength of the infrared light received and measured by the infrared light receiving device, and comparing the calculated signal strength with the first preset value; and when the strength of the received signal is larger than the first preset value, switching the infrared light emitting device to the second infrared light emitting strength mode which is relatively weaker to emit infrared light at the time of next infrared light emission;

wherein the first infrared light emitting strength mode is the strongest of the infrared light emitting strength modes of the position sensitive detector, and only when the signal strength of the received infrared light is smaller than a lower threshold in the first infrared light emitting strength mode, conducting multiple additional infrared emissions in the first infrared light emitting strength mode and calculating an average estimated distance to an object reflecting infrared light back from the multiple additional infrared emissions.

2. The method according to claim 1, wherein a second preset value is set, wherein the second preset value is lower than the lower threshold in the first infrared light emitting strength mode, and when the strength of the received signal is smaller than the second preset value, the infrared light emitting device is switched to the first infrared light emitting strength mode to emit infrared light at the time of next infrared light emission.

3. The method according to claim 2, wherein the strength of the received infrared signal is measured as a first voltage for light emitted in the first infrared light emitting strength mode and a second voltage for light emitted in the second infrared light emitting strength mode, and wherein the first voltage is compared to the first preset value in determining whether to switch to the second infrared light emitting strength mode and the second voltage is compared to the second preset value in determining whether to switch back to the first infrared light emitting strength mode.

4. A method for saving power consumption of a position sensitive detector, wherein the position sensitive detector comprises an infrared light emitting device and an infrared light receiving device, and the infrared light emitting device is configured with infrared light emitting modes of at least two strengths which are a first infrared light emitting strength mode and a second infrared light emitting strength mode, the method comprising the steps of:

emitting, by the infrared light emitting device, infrared light in the first infrared light emitting strength mode which is relatively stronger;

receiving, by the infrared light receiving device, the infrared light as reflected back;

setting a first preset value, calculating a signal strength of the infrared light received and measured by the infrared light receiving device, and comparing the calculated signal strength with the first preset value; and when the strength of the received signal is larger than the first preset value, switching the infrared light emitting device to the second infrared light emitting strength mode which is relatively weaker to emit infrared light at the time of next infrared light emission;

wherein the first infrared light emitting strength mode is the strongest of the infrared light emitting strength modes of the position sensitive detector, and only when the signal strength of the received infrared light is smaller than the first preset value, checking for whether an initial distance estimation from the position sensitive detector to the infrared reflecting object is within a first range and, only if the initial distance estimation to the infrared reflecting object is within the first range, conducting multiple additional infrared emissions in the first infrared light emitting strength mode and calculating an average estimated distance to an object reflecting infrared light back from the multiple additional infrared emissions.

* * * * *